United States Patent [19]
Stute et al.

[11] Patent Number: 5,489,340
[45] Date of Patent: Feb. 6, 1996

[54] PROCESS FOR THE PRODUCTION OF A HOT DISPERSIBLE STARCH

[75] Inventors: Rolf Stute, Flein; H. Rainer Neste, Lübeck-Israelsdorf; Axel Melwitz, Unterheinriet, all of Germany

[73] Assignee: CPC International Inc., Englewood Cliffs, N.J.

[21] Appl. No.: 164,981

[22] Filed: Dec. 10, 1993

Related U.S. Application Data

[63] Continuation of Ser. No. 686,055, Apr. 15, 1991, abandoned.

[51] Int. Cl.[6] .............................. C08B 30/00; A23L 1/05; A23L 1/216
[52] U.S. Cl. .................. 127/67; 127/71; 426/578; 426/637
[58] Field of Search ................ 127/67, 71; 426/578, 426/637

[56] References Cited

U.S. PATENT DOCUMENTS

| | | | |
|---|---|---|---|
| 192,426 | 9/1919 | Kreesmann | 106/213 |
| 1,551,472 | 8/1925 | Dunham | 106/210 |
| 3,137,592 | 6/1964 | Protzman et al. | 127/71 |
| 3,578,497 | 5/1971 | Hjermstad | 127/71 |
| 3,977,897 | 8/1976 | Wurzburg et al. | 127/32 |
| 4,260,642 | 4/1981 | Mitchell et al. | 127/71 |
| 4,418,090 | 11/1983 | Bohrmann et al. | 426/579 |
| 4,491,483 | 1/1985 | Dudacek et al. | 127/71 |
| 4,508,576 | 4/1985 | Mudde | 127/32 |
| 5,100,475 | 3/1992 | Würsch et al. | 127/67 |

*Primary Examiner*—Paul Lieberman
*Assistant Examiner*—Patricia L. Hailey

[57] ABSTRACT

The invention relates to a process for the production of a hot-dispersible HMT-starch with delayed thickening by treating starch in the presence of moisture at an elevated temperature, whereby the treatment is carried out in the presence of grated potatoes, potato juice or combinations thereof.

11 Claims, 7 Drawing Sheets

PROCESS FOR THE PRODUCTION OF A HOT DISPERSIBLE STARCH

This application is a file wrapper continuation of Ser. No. 07/686,055, filed Apr. 15, 1991, now abandoned.

BACKGROUND OF THE INVENTION

The present invention relates to a method for producing a hot-dispersible HMT-starch with delayed thickening and to the starch so produced.

The term "HMT starches" is applied by those in the art to starches which have been subjected to a heat and moisture treatment. In contrast to other physical treatments (as for instance in the case of production of pregelatinized cold swelling starches), in such a purely physical treatment the properties of the starch (ability to swell, dispersibility etc.) is modified in such a way that no gelatinization or any other recognizable change of the starch granules, is detectable (for instance the typical birefringence of a native starch granule is completely retained when such HMT starches are examined under a polarizing microscope).

Significant changes in the starch properties can be obtained by a heat-moisture treatment of those starches showing a B or C type x-ray pattern. A typical B type starch is potato starch, which therefore is particularly suited for a heat-moisture treatment.

In the case of potato starch, the original properties are substantially modified by such a heat-moisture treatment. For instance, untreated potato starch yields a transparent clear paste with a stringy, sticky consistency after gelatinization while a heat-moisture treated potato starch forms short, opaque pastes and on cooling even moldable gels. Whereas natural starch forms lumps when added to boiling water, heat-moisture treated starch is hot dispersible, and, although natural potato starch thickens as soon as the gelatinization temperature is attained, in the case of a heat-moisture treated starch, the gelatinization is delayed and in some cases may even take place at temperatures above 100° C.

The essential parameters determining the degree of heat-moisture treatment are the moisture content of the starch, the temperature of treatment and the time of treatment. In general it can be said that the higher the moisture content of the starch, the higher the degree of modification. However, moisture contents above a certain level limit the maximum possible processing temperature because the starch granule will be gelatinized. In the same way an increase in temperature increases the degree of modification, too high a temperature not only involves the risk of gelatinization but also the risk of thermal degradation of the starch (the so-called dextrinization). Similarly, prolonged treatment times lead to higher degrees of modification.

In the processes known up to now in which aqueous starch slurries are used, heating is only possible up to a temperature just below the gelatinization temperature. This requires careful control of temperature and time in order to exclude any gelatinization of the starch, as well as resulting in long treatment times of up to several days. For this reason it is preferred to reduce the moisture content to such a degree that the starches can be treated at temperatures above the normal gelatinization temperature without gelatinization. Such processes are called "semi-dry processes", and substantially shorten the treatment time. The general aspects of heat-moisture treatment of starches are described in detail in "Heat-Moisture Treatment of Starch" in Cereal Chemistry 44, (1967) 8–26. In addition, a whole series of patents are available which describe various forms of heat-moisture treatments, the majority of which are semi-dry processes.

German patent specification no. 2,930,664 provides a very detailed description of the problems which are involved in semi-dry processes for the manufacturing of HMT starches. The patent relates to a food product which contains a thickening agent consisting of an HMT root and/or tuber starch. The starches used for this purpose are treated in a semi-dry process at 103° C. for 115 minutes or, respectively, at 100° C. for 195 minutes. Some patents using the semi-dry principle recommend the addition of emulsifiers (European patent 76381, U.S. Pat. No. 184,527) or, respectively, the use of microwaves for the transfer of heat (European patent 150,715 and U.S. Pat. No. 4,508,576).

In processes operating in an aqueous suspension, the main emphasis is placed on the suppression of the gelatinization which can easily occur in the presence of excess water. In U.S. Pat. No. 3,977,897 the addition of salts, such as sodium or magnesium sulfate, is recommended in order to increase the gelatinization point, but such salts have to be removed by intensive washing before the starches can be used in foodstuffs. By using very high salt concentrations it is possible to apply temperatures up to 100° C. which, of course, remarkably reduce the treatment times.

In U.S. Pat. No. 3,583,874 and European patent no. 110,549 the gelatinizing effect of water during the heat-moisture treatment is suppressed by a sufficiently large addition of organic solvents, miscible with water (e.g. alcohol). Such methods are not only technically complicated but are expensive so that they have not been proposed for the HMT starches set forth herein, but only for the production of special cold swelling starches. In said processes the removal of the solvent is always the problem, which, of course, is necessary before such starches can be used for foodstuff applications.

Processes in which an effective heat-moisture treatment is performed in a short treatment time in an aqueous suspension without suppression of gelatinization, have not yet been described.

SUMMARY OF THE INVENTION

The present invention thus relates to a process for the production of a hot-dispersible HMT starch, in particular potato starch with delayed thickening, by the treatment of the starch in the presence of moisture at an elevated temperature and preferably in an aqueous suspension.

It has surprisingly been discovered that the heat-moisture treatment in an aqueous system may be considerably accelerated if the treatment is performed in the presence of grated potatoes and/or potato juice.

Accordingly, the present invention provides a process for producing a hot-dispersible HMT-starch having a delayed thickening, which process comprises treating starch in the presence of moisture at an elevated temperature, and is characterized in that the treatment is carried out in the presence of grated potatoes, potato juice, or some combination thereof. In various aspects, the treatment is preferably performed at a temperature of 50°–80° C. and for 20–80 minutes. Potato starch is a preferred starch.

DETAILED DESCRIPTION OF PREFERRED EMBODIMENTS

This invention relates to a process for producing a hot-dispersible HMT-starch with delayed thickening. More particularly, we have found that moist heat treatment of starch in the presence of grated potatoes and/or potato juice can accelerate the treatment as well as facilitate a lower treatment temperature.

An acceleration of the process means that the heat-moisture treatment may not only be performed at lower temperatures, generally in a range of from about 50 to about 80° C., but also in a substantially shorter time, generally from about 20 to about 80 minutes. It is thus the first time that a process operating in an aqueous suspension can be performed in a technically simple and economic manner.

In the case of a typical execution of the treatment of the invention the temperature is approximately 55° C. and the duration approximately 30 minutes. In order to produce a HMT potato starch with the same delayed thickening and otherwise comparable properties via the conventional semi-dry process it would be necessary to use a temperature of 100° C. and a treatment time of 120 minutes.

The process in accordance with the present invention may also be used for whole potatoes, but such a form of the invention is not suitable for use in industry because it is inefficient and therefore generally not preferred. For an industrial application grated potatoes are preferred as they normally are obtained in the first stages of an industrial potato starch production and/or the potato juice, which is remixed with the starch after the starch-fiber separation.

Other starches with a B or C type X-ray pattern which are suited for a heat-moisture-treatment, can also be treated. This means most of the root, tuber, and legume starches like Canna-, lotus root or sweet potato starch.

It is thought that the unsaturated fatty acids present in the potatoes, which are liberated upon the destruction of the cells or which are rapidly produced by an enzymatic hydrolysis, are at least partly responsible for the effective acceleration of HMT-starch modification. However, in addition, other components of the potato are active as co-catalysts, since a potato juice, from which the protein and the lipids have been removed still leads to a distinct, albeit reduced accelerating effect (see example 3).

It is known that potato lipids (mainly phosphatides and galactolipids) are characterized by a high content of unsaturated fatty acids. Therefore, it has already been proposed (see German patent 2,551,342) to isolate the lipids from potato juice as a valuable by-product of the potato starch production. Due to their high content of phosphatides and galactolipids these lipids have an application potential as emulsifiers. However, it was not known up to now that these lipids or their components are suitable for accelerating the modification of starch in an heat-moisture treatment.

Linoleic acid and linolenic acids, which are formed by the enzymatic cleavage of potato lipids, and which, if added as such, also show a pronounced accelerating effect (example 4) even without the co-catalytic effect of potato juice are hardly suitable as accelerators for industrial heat-moisture treatment of starches, due to the expense but more importantly due to the lack of stability (autoxidation, polymerization). Starches, to which linoleic acid or linolenic acid have been directly added prior to the heat-moisture treatment, are unsuitable for foodstuff purposes after the treatment, since they develop a distinct off-taste.

The process in accordance with the present invention may also be operated as a semi-dry process, in which commercially available potato starch is equilibrated at a moisture content suitable for a heat-moisture treatment according to the semi-dry conditions by the addition of potato juice. In such a semi-dry treatment the moisture content should generally not exceed 30% and in no instance exceed 35%, otherwise the flowability of the starch will be insufficient for the application of the semi-dry method. Moisture contents in a range of from about 15 to about 35% are possible. Preferably, the moisture content is in the range of from about 18 to about 30%.

In the process of the invention it is also possible to use conventional additives, especially surface-active substances such as glycerol monostearate, lysolecithin, stearoyl-2-lactylate and Na-stearylfumarate, which are usually added in such processes as ingredients or due to technical reasons.

The preferred field of application of the process in accordance with the invention is the slurry method. Hitherto, slurry methods have been avoided as far as possible in favor of semi-dry ones because the long treatment times which are necessary at temperatures where no gelatinization of the starch occurs are distinct technical and economic disadvantages. Now, according to the present invention, low temperatures (preferred in accordance with the invention 30 minutes at 55° C.) and very short treatment times are possible. Under these conditions in the presence of water only, no modification of the potato starch can be obtained at all (Example 1).

In a particularly preferred application of the invention, the treatment process is thus performed during the production of potato starch within the raw potato slurry prior to the separation of the potato juice and the pulp. The slurry may be produced from grated potatoes with or without the addition of additional water.

It is also possible to suspend the starch in potato juice after the separation of the pulp or to use commercially available potato starch. The water content in the slurry process will generally be in the range of from about 40 to about 90%. It is an advantage if the starch dry matter content is approximately 10 to approximately 25%.

In order to prevent a discoloration of the raw potato slurry or of the potato juice during the treatment process, it is recommended to add sulfite in a concentration which is conventionally used in potato starch manufacturing. The addition of from about 200 to about 800 and preferably from about 400 to about 600 ppm sulfur dioxide ($SO_2$) based on the total slurry weight is generally sufficient.

Compared with processes known so far for the heat-moisture treatment of starches and more especially as compared with the semi-dry process, which presently are preferred, the process in accordance with the invention offers the following advantages:

The treatment may be carried out at low temperatures and in open containers. Pressure vessels, as they are required for the temperatures above 100° C. and which are usually applied in semi-dry processes, are no longer necessary. Furthermore, there is no risk of partial gelatinization, which in pressure vessels always is a technical problem because of water condensation at the cooler part of the vessels.

The heat-moisture treatment may be performed directly or respectively in a by-pass of the potato starch manufacturing process. The separation and drying of the starch therefore does not represent an additional process step.

The slurry method is easier to control with respect to the degree of treatment. While in the case of semi-dry processes small differences in moisture lead to great differences in the degree of modification, this factor does not play any role due to the presence of excess water.

The treatment process may be performed without the recommended additions of emulsifiers such as glycerol monostearate etc., or may, of course, be performed in the presence of such emulsifiers as well as in the presence of linoleic and and/or linolenic acid and/or their alkali salts. In spite of the fact that the latter may be an advantage technically, it is a disadvantage regarding price and stability.

Accordingly to the improved hot dispersibility and the delayed thickening the HMT potato starch produced using the present invention is particularly suited as a binding agent in dry foodstuffs and more especially in all those cases where a free flowing binding agent is required, which can be added into boiling liquids without the formation of lumps, as for instance as a sauce binder or a thickener for dry soups.

The effectiveness of the process according to the invention will be explained on the basis of the following examples 1 through 6 in detail (examples 1–4 Brabenderviscograph, 500 cmg load cell, 25 g starch in 475 ml water each, example 5 and 6 350 cmg load cell, 30 g starch in 470 ml water). The examples are not meant to limit the invention in any manner.

Example 1

Figure 1:
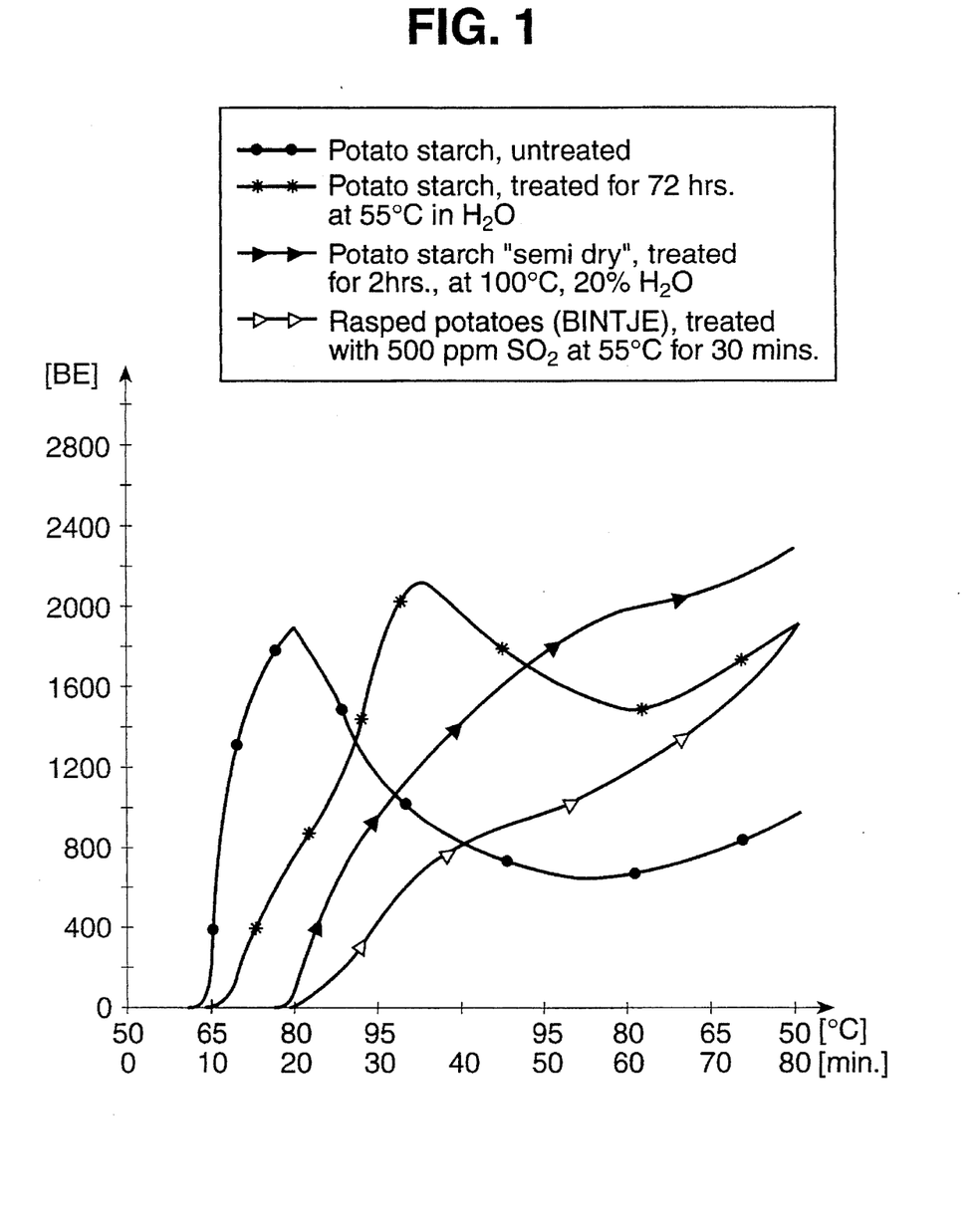
FIGS. 1–7 depict viscosity curves generally comparing the properties of the inventive starch produced by the present process with starches processed differently.

1.5 kg of potatoes of the variety Saturna are grated with the addition of 500 ppm $SO_2$ in the conventional manner of a potato starch production. The slurry, which may have some water added in order to reduce the viscosity is heated for 30 minutes at 55° C. while stirring continuously. Thereafter, the starch is separated in the known manner, as in the production of potato starch. The isolated starch shows an even more pronounced modification of its properties than a starch (FIG. 1) treated in the semi-dry process for 2 hours at 100° C. and a water content of 20%. A heat-moisture treatment in water even if extended to 72 hours does not lead to anything near as good a result.

Example 2

Figure 2:
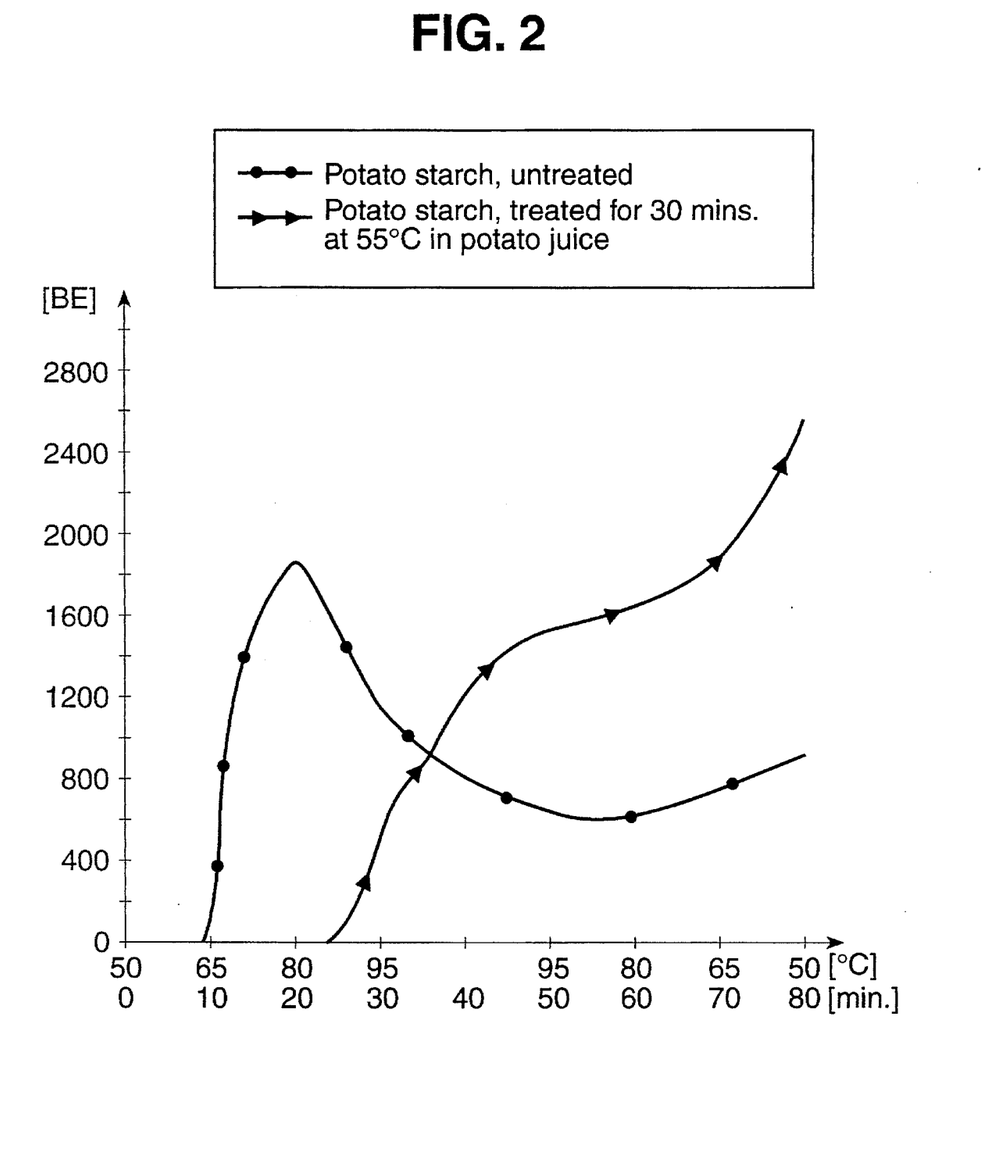

200 g of natural potato starch are heated in 2 liters of potato juice as it is produced in potato starch factories after separation of the starch and pulp, for 30 minutes at 55° C. Also, in this case, there is similarly pronounced treatment effect as is the case of grated potato (FIG. 2).

Figure 3:
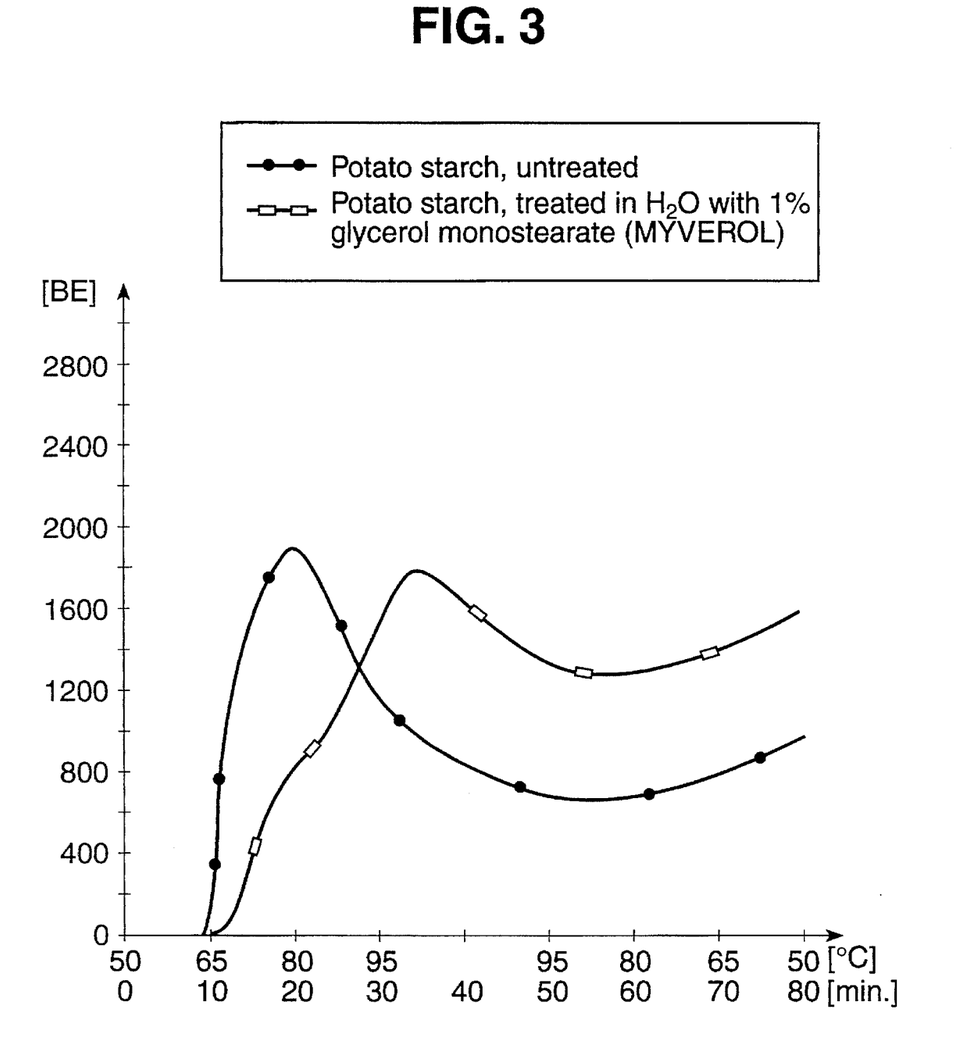

Comparative Example A 200 g of natural potato starch are heated in 2 liters of water in the presence of 1% Myverol (commercially available glycerol monostearate) for 30 minutes at 55° C. With this emulsifier, which form complexes with starch and which is recommended in various heat-moisture processes as an additive enhancing the treatment effect no effect can be obtained which is comparable with the effect obtained in the presence of potato constituents (FIG. 3).

Example 3

Figure 4:
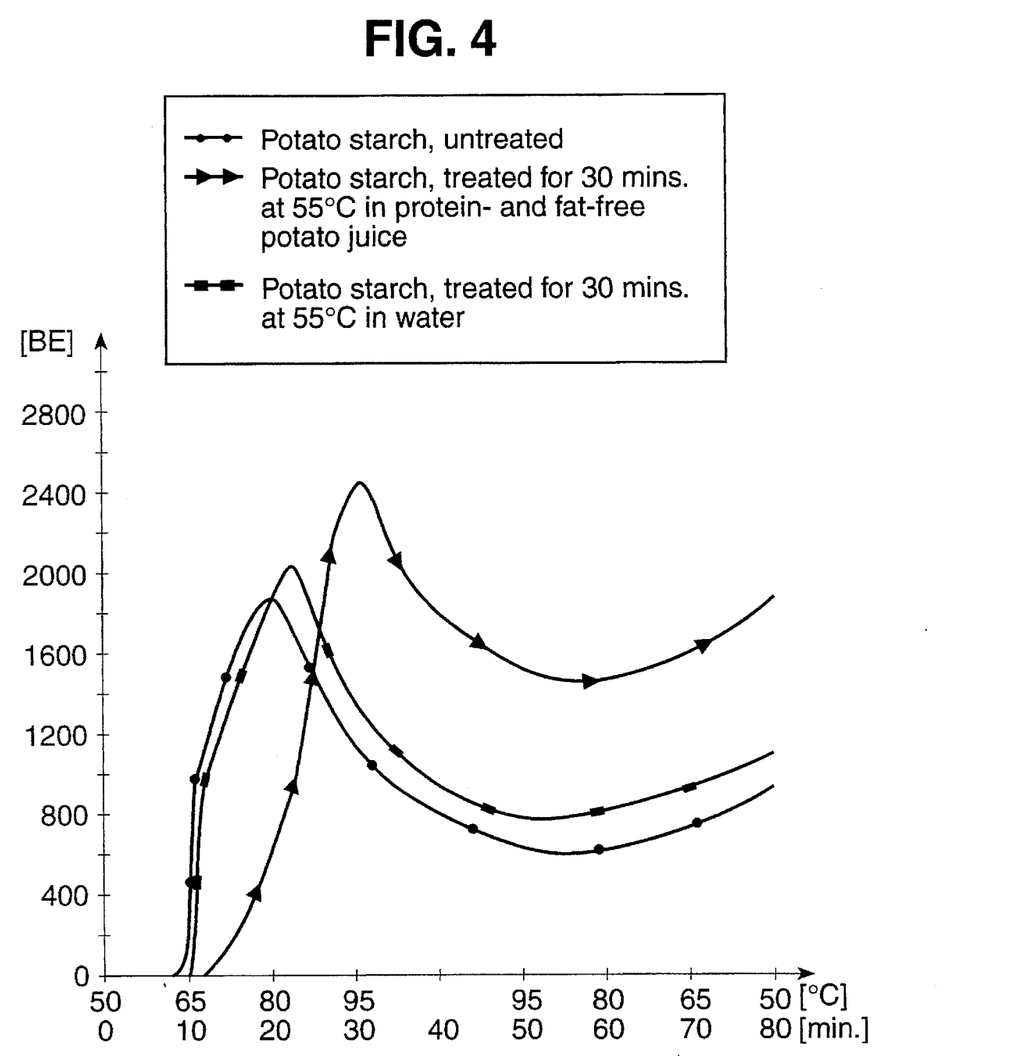

Protein and fat were removed from 2 liters of potato juice by thermal coagulation of the protein and extraction of the fat. 200 g of natural potato starch were treated therein under the same conditions as in Example 1. Also, the protein- and fat-free potato juice produced a distinct but somewhat weaker modification (FIG. 4). The accelerating action is thus a synergistic effect of various constituents of the potato juice.

Example 4

Figure 5:
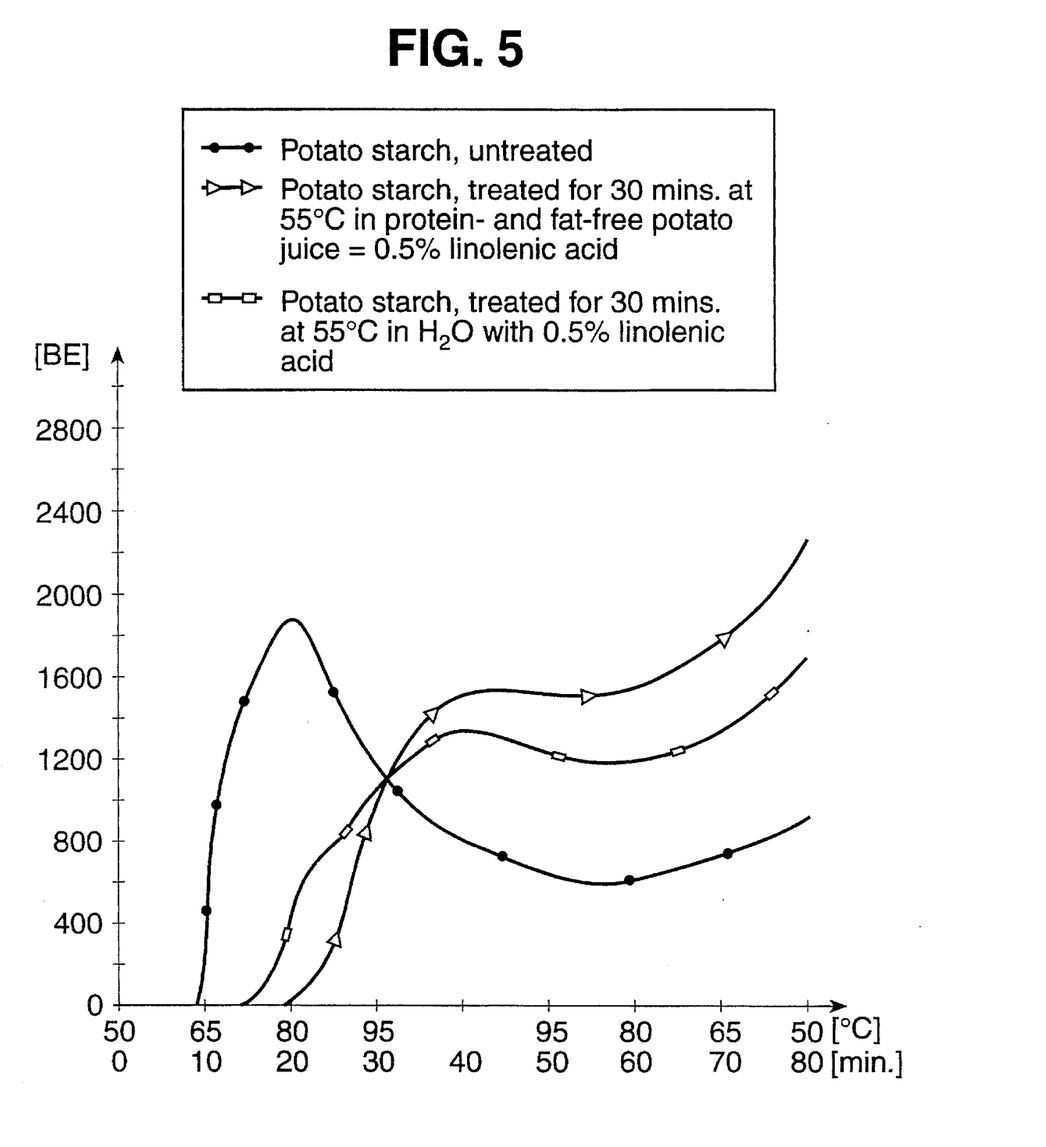

220 g portions of natural potato starch were treated (as in Example 3) for 30 minutes at 55° C. in water to which 0.5% linolenic acid had been added on the one hand and on the other hand potato juice free of protein and lipid also containing 0.5% linolenic acid. As FIG. 5 shows, linolenic acid in water has a pronounced accelerating effect on the heat-moisture treatment. However, the effect is again further enhanced by the components of the potato extract water.

Example 5

Figure 6:
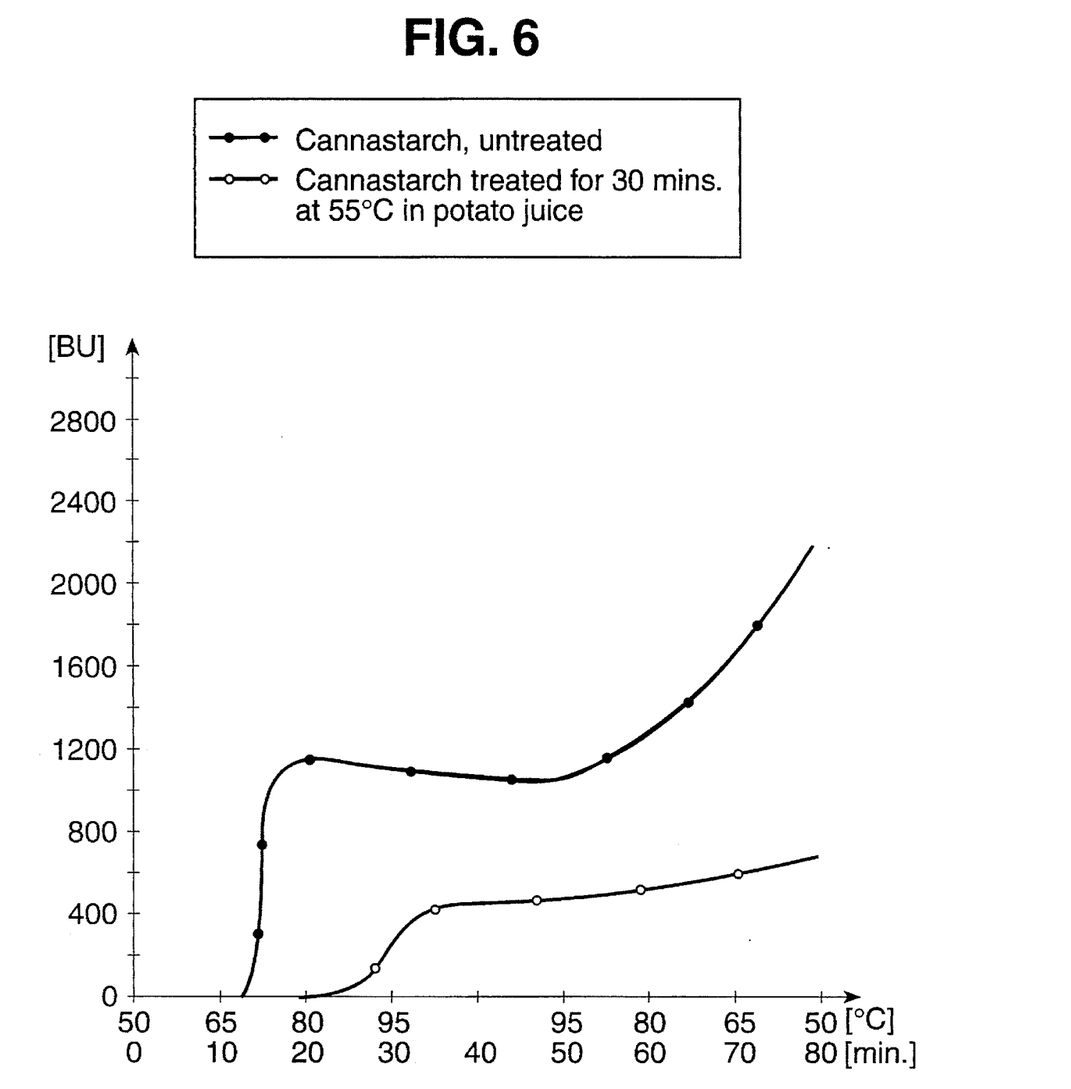

400 g native Canna starch was treated for 30 minutes at 55° C. in 1,2 liter potato juice obtained from Bintje potatoes to which 500 ppm $SO_2$ was added. After the treatment the starch was isolated and dried as usual. FIG. 6 shows that also for this starch by the treatment in potato juice a strong property modification can be obtained.

Example 6

Figure 7:
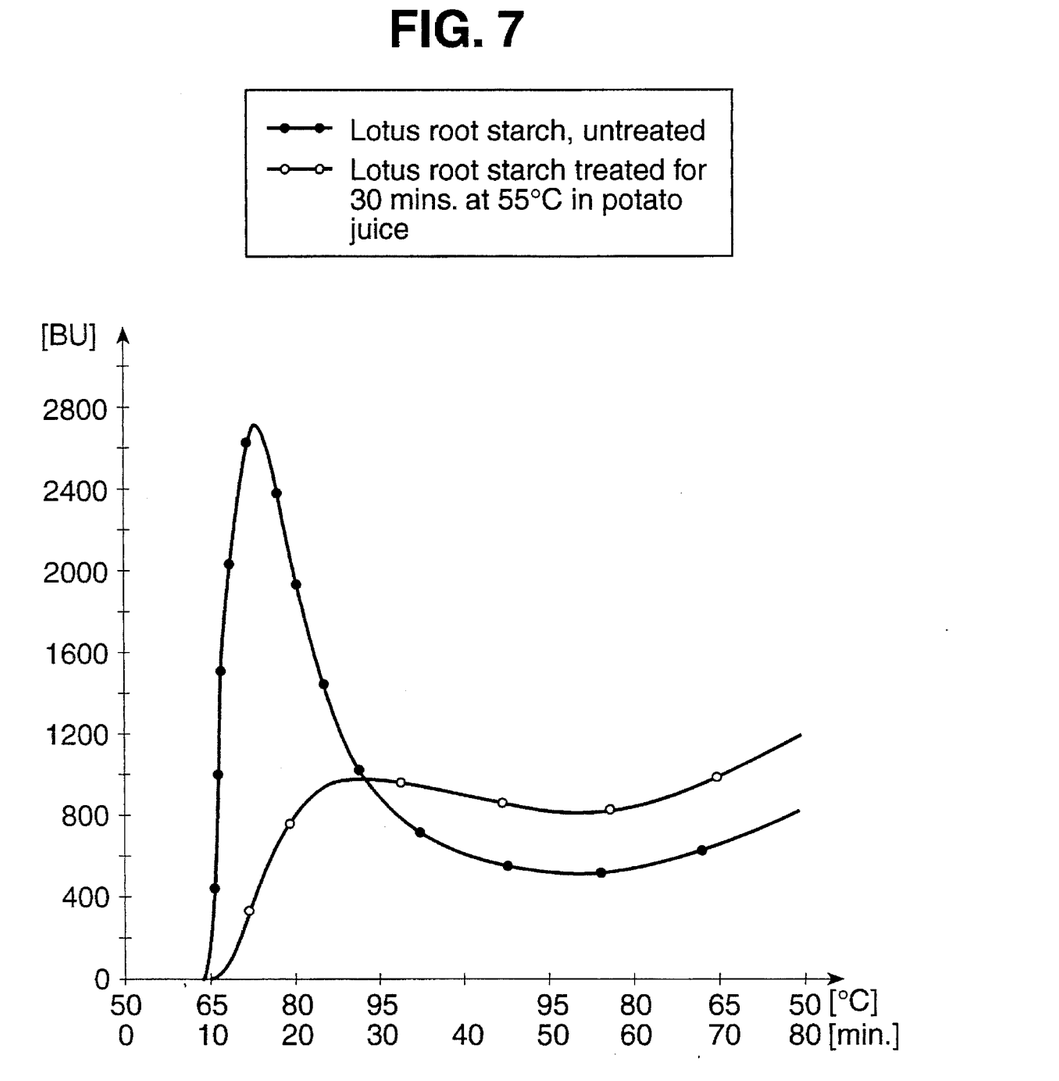

400 g lotus root starch was treated in the same way as Canna starch was treated in Example 5. Again, the property changes, which are typical for a successful heat-moisture treatment, were obtained (FIG. 7).

What is claimed is:

1. A process for the production of a binding agent for use in dry foodstuffs comprising a hot-dispersible HMT-starch with delayed thickening, by treating starch, chosen from the group consisting of root, tuber or legume starches, in the presence of moisture at a temperature of from about 50° to about 80° C. for from about 20 to about 80 minutes consisting essentially of treating the starch in the presence of potato components selected from the group consisting of grated potatoes, potato juice, or a combination thereof with grated potatoes, where potato juice is the separated liquid portion of raw potato slurry formed during production of potato starch.

2. The process according to claim 1, wherein potato starch is used as the starch.

3. The process according to claim 1, wherein the starch treatment is carried out at about 55° C. for about 30 minutes.

4. The process according to claim 1, wherein it is carried out in a slurry process.

5. The process according to claim 4, wherein the liquid content of the slurry amounts to from about 40 to about 90%.

6. The process according to claim 4, wherein it is worked with a starch dry matter content of about 10 to about 25%.

7. The process according to claim 1, wherein the process is carried out during the manufacturing of the potato starch within the potato raw slurry prior to the separation of the potato juice and the pulp and before the starch is isolated.

8. The process according to claim 1, wherein it is carried out during the potato starch manufacturing process with the starch fraction which is recombined with the potato juice before the starch is isolated and dried.

9. The process according to claim 1, wherein it is carried out with potato juice in a semi-dry process with a moisture content of the mass to be treated of from about 15 to about 35%, and to obtain a thickened mass having a Brabender viscosity of at least 500 units greater than the untreated mass.

10. The process according to claim 1, wherein it is carried out with potato juice in a semi-dry process with a moisture content of the mass to be treated of from about 18 to about 30%.

11. A binding agent for use in dry foodstuffs comprising a hot-dispersible HMT-starch with delayed thickening produced according to the process of claim 1.

* * * * *